United States Patent
Sebestyen

(10) Patent No.: US 6,570,676 B1
(45) Date of Patent: May 27, 2003

(54) METHOD AND SYSTEM THE TRANSMISSION OF FACSIMILE-ENCODED INFORMATION BETWEEN MULTIMEDIA-CAPABLE COMMUNICATION TERMINAL EQUIPMENT

(75) Inventor: Istvan Sebestyen, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/572,982

(22) Filed: May 17, 2000

Related U.S. Application Data

(63) Continuation of application No. 08/836,995, filed as application No. PCT/DE95/01564 on Nov. 13, 1995, now Pat. No. 6,246,490.

(30) Foreign Application Priority Data

Nov. 11, 1994 (DE) .......................... 44 40 402
Mar. 13, 1995 (DE) .......................... 195 09 022

(51) Int. Cl.[7] .......................... H04N 1/00; G06F 13/00; H04J 3/16
(52) U.S. Cl. .......................... 358/425; 358/115; 370/469
(58) Field of Search .............................. 358/425, 1.15, 358/442, 468, 400, 404, 405; 379/100.01; 370/395.5, 469–487

(56) References Cited

U.S. PATENT DOCUMENTS

| | | | |
|---|---|---|---|
| 5,283,638 A | 2/1994 | Enberg et al. | |
| 5,283,819 A | 2/1994 | Glick et al. | |
| 5,367,522 A | 11/1994 | Otani | |
| 5,506,903 A * | 4/1996 | Yamashita | 380/19 |
| 5,526,350 A | 6/1996 | Gittins et al. | |
| 5,574,724 A | 11/1996 | Bales et al. | |
| 5,600,844 A | 2/1997 | Shaw et al. | |
| 5,657,134 A | 8/1997 | Numata et al. | |
| 5,682,386 A | 10/1997 | Arimilli et al. | |
| RE35,740 E | 3/1998 | Piasecki et al. | |
| 5,754,687 A | 5/1998 | Fujimori et al. | |
| 5,920,661 A | 7/1999 | Mori et al. | |
| 6,034,968 A * | 3/2000 | Park et al. | 370/465 |
| 6,121,998 A * | 9/2000 | Voois et al. | 348/14 |

FOREIGN PATENT DOCUMENTS

| | | |
|---|---|---|
| WO | WO 92/02100 | 2/1992 |
| WO | WO 92/21211 | 11/1992 |

OTHER PUBLICATIONS

Fifth Nordic Seminar on Digital Mobile Communications, "The Siemens D900 solution for Fax Group 3 support in the Interworking Function," I. Dittrich, pp. 55–62, XP 000457835, I. Dittrich, Dec. 3, 1992.

Fujitsu–Scientific and Technical Journal, Bd. 28, Nr. 2, pp. 172–179, XP 00312058, Multimedia Communication Technology, Imai et al., Jan. 1, 1992.

Patent Abstract of Japan, vol. 16, No. 441, (E–1264), Oct. 17, 1990.

* cited by examiner

*Primary Examiner*—Madeleine Nguyen
(74) *Attorney, Agent, or Firm*—Staas & Halsey LLP

(57) ABSTRACT

A method and apparatus for the transmission of facsimile-encoded information from a sending communication terminal equipment via a communication network to a receiving communication terminal equipment employs facsimile transmission protocols includes steps of: compressing information in the sending communication terminal equipment; dividing the compressed, facsimile-encoded information in a facsimile adaption layer and matching the information to the multimedia packet multiplex layer; each facsimile data block is handed over to the multiplex layer identified as facsimile information data block; and all information data blocks are multiplexed by the sending communication terminal equipment with other information data blocks for voice, video, data, etc., are transmitted to the receiving communication terminal equipment and demultiplexed therein.

5 Claims, 3 Drawing Sheets

Figure 1:
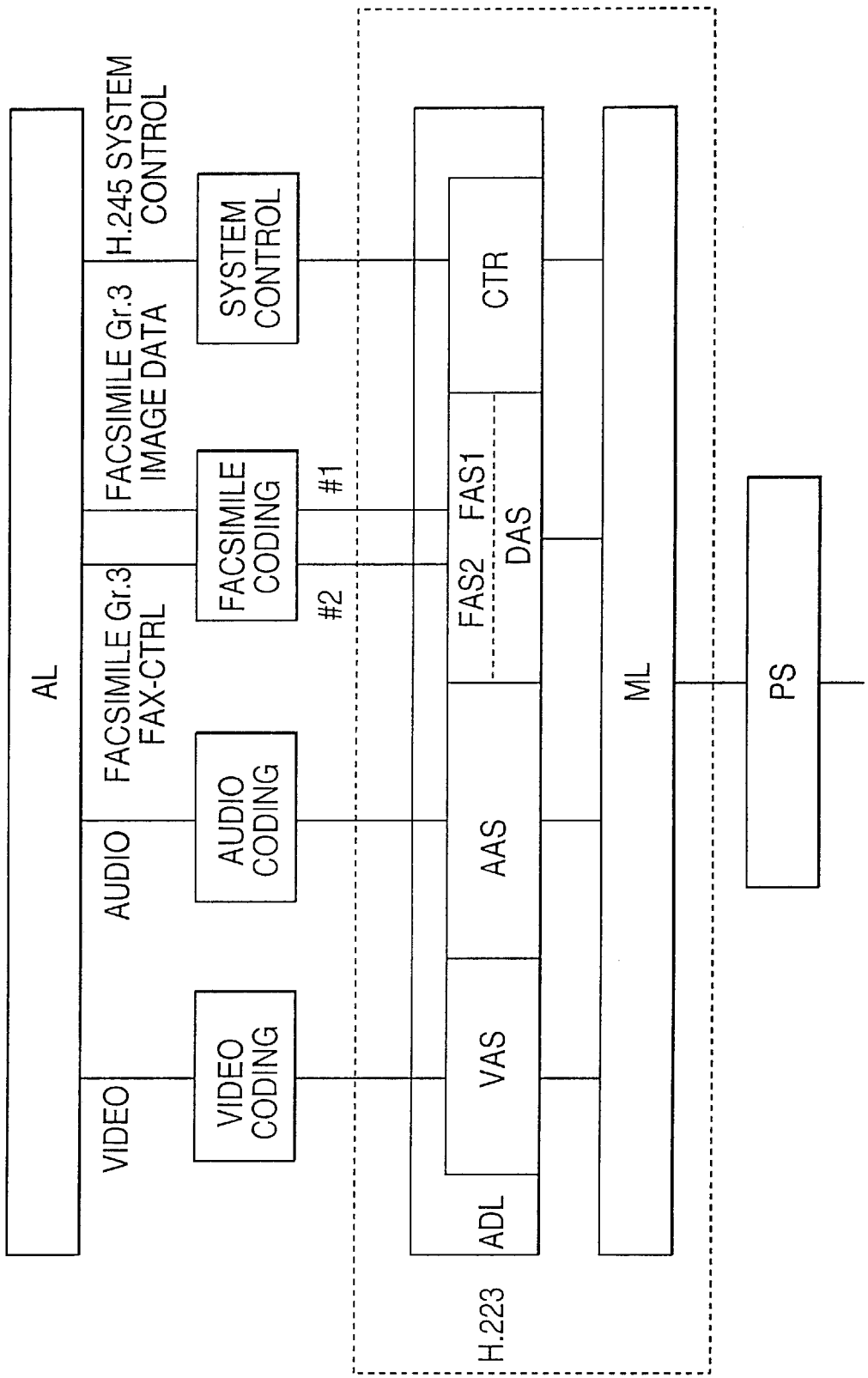

METHOD AND SYSTEM THE TRANSMISSION OF FACSIMILE-ENCODED INFORMATION BETWEEN MULTIMEDIA-CAPABLE COMMUNICATION TERMINAL EQUIPMENT

CROSS-REFERENCE TO RELATED APPLICATIONS

This application is a continuation of application Ser. No. 08/836,995, filed May 12, 1997, now U.S. Pat. No. 6,246,490.

The invention is directed to a method and an arrangement for the transmission of facsimile-encoded information between multimedia-capable communication terminal equipment as known for the transmission of data, video and audio signals and implement their transmission upon employment of a protocol according to ITU-T H.223 or, respectively, H.245 (the version of 11/1995 is meant).

The terminal equipment of telefax group 3 connectable to a communication network via analog interfaces are used mainly for the transmission of digital still pictures. The still pictures to be communicated over the telecommunication networks are composed of a great plurality of minute black and white mosaic squares of the same shape and size (called pixels). The original still pictures are either scanned by a scanner and resolved into black or white pixels or are generated by a computer as the result of a document/drawing production. First, they are compressed in order to reduce the quantity of information to be transmitted, and then they are divided into information blocks and communicated block-by-block via the telecommunication network. In the receiving telefax terminal equipment, the received information are decompressed and decoded into the original black and white pixels, wherewith an image that looks like the original is compiled (and therefore represents a "facsimile" thereof). The received image is usually printed out on paper by the receiving terminal equipment or, in some cases, is presented on a display picture screen or stored on local, digital storage devices such as magnetic disk.

The method employed by terminal equipment of the telefax group 3 has been standardized according to the International Telecommunication Union (ITU) in the corresponding ITU-T recommendations for group 3 (ITU-T T.4, ITU-T T.6, ITU-T T.30) (last revision 1995 in the meantime).

A facsimile group 3 device is usually a "monomedia" communication terminal equipment, i.e. it can normally only transmit one specific type of information (namely, a facsimile pixel image).

By comparison thereto, multimedia-capable communication terminal equipment are in the position of simultaneously transmitting two information types such as, for example, a facsimile pixel image accompanied with voice.

An object of the invention is to specify a method that is simple to realize for facsimile image transmission in the framework of multimedia communication via a communication network that enables the realization of auxiliary communication services regardless of whether the communication terminal equipment are connected to the communication network via analog or digital interfaces. Over and above this, arrangements for the implementation of such a method are to be specified.

This object is achieved by a method having the features of claim 1 or by a method having the features of claim 2. Beneficial developments are the subject matter of subclaims. Further, an arrangements [sic] for implementation of specific developments of the inventive method is recited in claim 5.

The invention is explained in greater detail below:

Instead of employing the known half-duplex or full-duplex (T.30 Annex C) protocol according to ITU-T T.30 in the information stream communicated between telefax terminal equipment, it is proposed to employ a new full-duplex protocol according to "Packet Media Mode" of the ITU PSTN/mobile picture telephone (ITU-T H.324 or, respectively, ITU-T H.32P/M series of ITU-T recommendations) in which the facsimile protocol according to ITU-T T.30 is multiplex with voice (encoded, for example, according to ITU-T G.723, G.729 or G.dsvd) with ITU-T H.223. The control, i.e. opening, transmitting and closing the facsimile channels, ensues with the assistance of an ITU-T multimedia channel controller according to ITU-T H.245.

An inventive method for the transmission of facsimile-encoded information from a sending communication terminal equipment via a communication network to a receiving communication terminal equipment upon employment of the facsimile transmission protocol according to ITU-T T.4 and ITU-T T.30 and of a flexible PSTN/mobile picture telephone protocol (ITU-T H.223 in the meantime) with respect to the user channels can have the following method steps given facsimile group 3 transmission with half-duplex facsimile protocol according to ITU-T T.30:

1a) A digital facsimile input information is compressed in the sending communication terminal equipment;

1b) The facsimile-encoded (according to ITU-T T.4, T.6) information is divided by a facsimile matching layer and matched to the multiplex packet multiplex layer lying therebelow (FIG. 1). For this, two data channels (data channel #1 and #2) are allocated and opened with the assistance of ITU-T H.245. Data channel #2 is used as full-duplex channel for the transmission of the facsimile control data according to ITU-T T.30. Among others, the device parameters and the shared transmission parameters (for example, image resolution, facsimile compression method, error correction method, facsimile transmission or reception) are exchanged in this data channel, selected and set; the successful/or unsuccessful transmission of the page and/or the facsimile transmission is confirmed; the communication ended after transmission of the facsimile message and the control returned to ITU-T H.245. Data channel #1 is allocated and opened as half-duplex channel for the transmission of the facsimile encoded data.

According to the settings, the facsimile data are encoded and sent over data channel #2.

1c) Each data block of the data channel #2 and #1 is handed over to the multiplex layer identified as facsimile information control block or, respectively, facsimile information data block;

1d) All information data blocks are multiplexed by the sending communication terminal equipment with potentially existing, other information data blocks for voice, video, data, etc., with the assistance of the multiplex layer upon employment of a PSTN/mobile picture telephone protocol adapted with ITU-T H.223, are transmitted to the receiving communication terminal equipment and demultiplexed therein;

1e) The demultiplexed information data blocks are respectively assigned to a matching layer allocated to the information data type of video, voice, data or facsimile, the facsimile matching layer forwards the facsimile information blocks to the data channels #1 and #2 of the receiver for application of a facsimile decompression method according to ITU-T T.4, T.6, T.30, and the decompressed facsimile information is output or further-processed. Here as well as in the cases described below, the facsimile matching layer can also be part of a data matching layer.

2) The following method steps can be provided given facsimile group 3 transmission with the new, optional full-duplex facsimile protocol according to ITU-T T.30 Annex C:

2a) a digital facsimile input information is compressed in the sending communication terminal equipment;

2b) The facsimile-encoded (according to ITU-T T.4, T.6) information is divided by a facsimile matching layer and matched to the multimedia packet multiplex layer lying therebelow (FIG. 1). For this, only one data channel (data channel #1) is allocated and opened with the assistance of ITU-T H.245. Data channel #1 is also used as full-duplex channel for the transmission of the facsimile control data according to ITU-T T.30 Annex C. Among others, the device parameters and the shared transmission parameters (for example, image resolution, facsimile compression method, error correction method, facsimile transmission or reception) are exchanged in this data channel, selected and set; the successful/or unsuccessful transmission of the page and/or the facsimile transmission is confirmed; the communication ended after transmission of the facsimile message and the control returned to ITU-T H.245. In data channel #1, the channel according to T.30 Annex C is allocated, opened and sent for the transmission of the facsimile encoded data.

2c) Each data block of the data channel #1 is handed over to the multiplex layer identified as facsimile information data block;

2d) All information data blocks are multiplexed by the sending communication terminal equipment with potentially existing, other information data blocks for voice, video, data, etc., with the assistance of the multiplex layer upon employment of a PSTN/mobile picture telephone protocol—according to ITU-T H.223 and H.245—, are transmitted to the receiving communication terminal equipment and demultiplexed therein;

1e) The demultiplexed information data blocks are respectively assigned to a matching layer allocated to the information data type of video, voice, data or facsimile, the facsimile matching layer forwards the facsimile information blocks to the data channel #1 of the receiver for application of a facsimile decompression method according to ITU-T T.4, T.6, T.30, and the decompressed facsimile information is output or further-processed.

In addition to the identification for facsimile information data blocks and facsimile control data blocks, an identification for audio (voice), video, data and control information data blocks is also provided in a beneficial development. Preferably, the facsimile transmission protocol according to ITU-T T.4, T.6, ITU-T T.030 and the PSTN/mobile picture telephone protocol according to ITU-T H.223 adapted with ITU-T H.245 is employed.

A facsimile device for the implementation of an inventive method contains an image scanner means, a printer means, a fax modem, a communication controller according to ITU-T T.30 and H.245, a multimedia multiplexer (H.223) and a facsimile encoder/decoder means (ITU-T T.4, T.6, T.81, T.82) as well as an audio input/output means such as, for example, loudspeaker and microphone. Over and above this, an audio signal encoder/decoder means is provided for the compression and decompression of audio input/output signals. As warranted, a PC or a data display can also be present.

Figure 2:
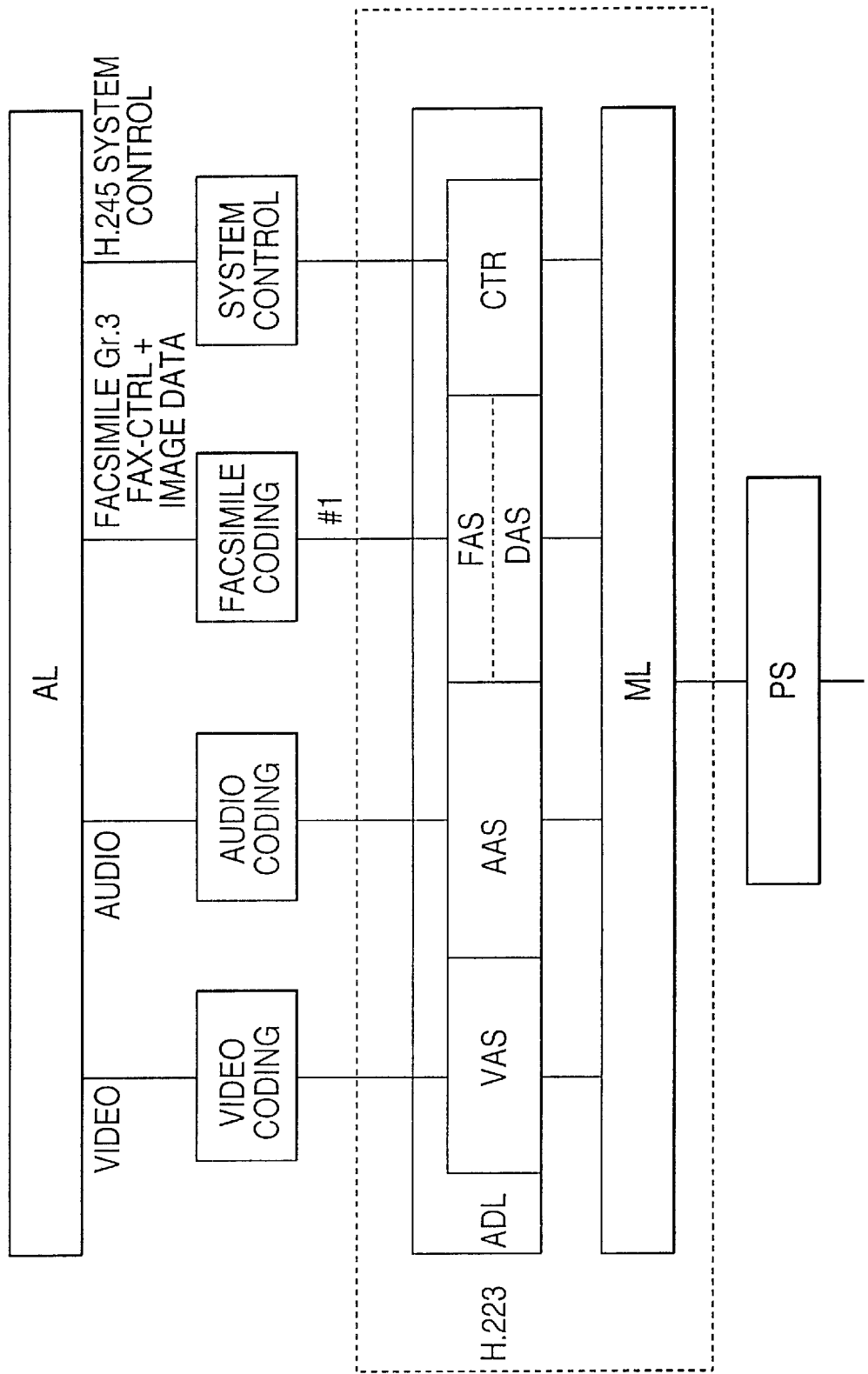
Figure 3:
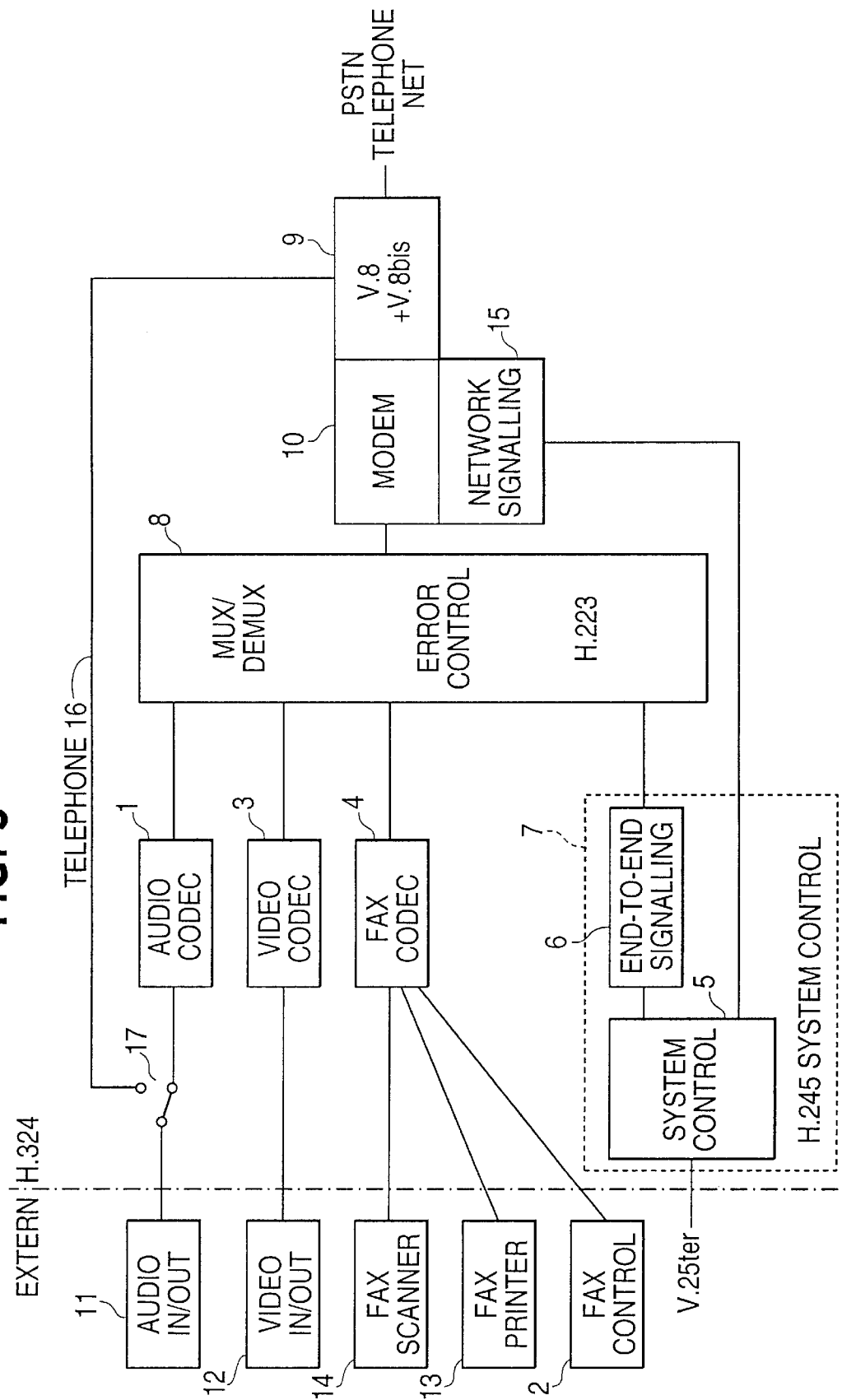

The invention is explained in greater detail below with reference to the FIGS. Shown are:

FIG. 1 the protocol layers of the multimedia facsimile according to claim 1;

FIG. 2 the protocol layers of the multimedia facsimile according to claim 1;

FIG. 3 the exemplary embodiment of a facsimile device for the implementation of an inventive method, shown in a block view.

Dependent on the individual realization forms, the invention makes use of some special characteristics of the Telefax Group 3 Standard and of the pending PSTN/Mobile Picture Telephone Standards ITU-T H.324, ITU-T H.223 and ITU-T H.245 of the ITU.

Namely, the employment of the full-duplex protocol to be introduced according to "Packet Media Mode" of the ITU PSTN/mobile picture telephone, whose protocol layers can be derived from FIGS. 1 and 2. This is a two-layer multiplex method. The physical connection is realized in the physical layer PS. This contains V.8, V.8bis and V.34 that is employed for the connection setup and for the modem communication.

In the lower layer ML (multimedia packet multiplex layer, Multiplex Layer, layer 2 according to OSI reference model) of the multiplex layer H.223 according to H.223, information packets are identified according to the various information types (video, audio/voice, data, facsimile data, facsimile control, multimedia terminal control) and multiplexed in different length. Moreover, an adaptation layer ADL for "Facsimile Group 3" (facsimile Gr3 Adaption Layer) sees to the protocol adaptation of the facsimile communication such as, for example, the error correction mode at the lower multiplex layer ML. As a result thereof, the multiplex layer H.223 is completely independent of the protocols of the applications (for example, facsimile). FIG. 1 also shows the physical layer PS subordinated to the multiplex layer, as well as to [sic] the individual types of the adaptation layer ADL, namely the Video Adaption Layer VAS, Data Adaption Layer DAS, Audio Adaption Layer AAS and Facsimile Adaption Layers FAS1 for facsimile data and FAS2 for facsimile control, as well as following, allocated "Higher Layers" for video coding, for data coding, for audio coding and facsimile coding. As needed, the latter are thereby fashioned as coder/decoder layers and connect the adaptation layer ADL to an Application Layer AL. The protocols according to H.223 contain the physical layer PS and the individual adaption layers ADL. FIG. 1 shows a data channel #1 for the transmission of facsimile data from the facsimila adaption layer FAS1 to the application layer AL and a data channel #2 for the transmission of facsimile control commands from the facsimile adaption layer FAS2 to the application layer AL. FIGS. 1 and 2 also show a specific data channel for the transmission of H.245 system control data System Control from the system adaption layer CTR to the application layer AL.

The protocol layers of the multimedia facsimile according to FIG. 2 differ from those according to FIG. 1 only on the point that, due to the full-duplex transmission to the fax codec Facsimile Coding, only one data channel #1 is provided and, likewise, only one facsimile adaption layer FAS is provided.

It also has a beneficial effect on the invention that the transmission rate of the telefax group 3 can be increased by optional addition of high-speed modems, to up to 33.6 kBit/s according to ITU-T V.34.

Further, the invention is promoted in that the current norming of speech encoders with very low bit rates leads to speech encoders with transmission rate of 5–8 kBit/s (ITU-T G.723, ITU-T G.729, ITU-T G.dsvd) dedicated for the picture telephony in the public switched telephone network in ITU-T. These require a protected transmission type, for example according to the "Packet Media Multiplexing" method (ITU-T H.223).

Upon incorporation as needed of the afore-mentioned features, the methods described in the current ITU-T recommendations can be expanded such that the above-described, required functionality, namely the transport of facsimile images via PSTN/mobile picture telephone protocols, can be effectively met.

Further, the invention enables the simultaneous transmission of multimedia information (for example, voice, facsimile image, data, moving picture). With this invention, for example, a written telefax message can be simultaneously commented upon by a spoken message during the facsimile transmission, this, for example, offering an introduction or an additional explanation or potentially serving as spoken commentary about the individual paragraphs of a received telefax message. FIG. 3 shows a facsimile device, an H.324 multimedia platform for the implementation of an inventive method. This contains an image scanner means Scanner 14, a printer means Printer 13, a modem 10, a communication controller 2 and 7 according to ITU-T T.30 and H.245, H.223, a multimedia multiplexer/demultiplexer 8 and a facsimile encoder/decoder means FAX codec 4, as well as an audio input/output means 11 such as, for example, loudspeaker or, respectively, microphone. Over and above this, an audio signal encoder/decoder means AUDIO-CODEC 1 (ITU-T G.723, G.729 or G.dsvd) is provided for the compression and decompression of audio input/output signals. FIG. 3 also shows a network interface via which the facsimile and multimedia device is connected to a communication network PSTN via the modem 10 as well as via telephone 16. Further, a switching means 17 that simplifies a monomedia audio mode is provided in the illustrated exemplary embodiment. A connection setup circuit 9 is also shown.

What is claimed is:

1. A method for transmitting facsimile-encoded information from sending communication terminal equipment to receiving communication terminal equipment, the sending and receiving terminal equipment being multimedia capable, said method comprising:

compressing digital facsimile input information in the sending communication terminal equipment into facsimile-encoded information;

dividing the facsimile-encoded information and facsimile control information into data blocks in a first adaptation layer for the facsimile-encoded information and in a second adaptation layer for the facsimile control information;

transferring the data block to a multiplex layer, each data block identified as one of a facsimile control information data block and a facsimile-encoded information data block;

multiplexing facsimile-encoded information data blocks in the sending communication terminal equipment with other information data blocks within the multiplex layer into multiplexed information data blocks;

transmitting the multiplexed information data blocks to the receiving communication terminal equipment utilizing a PSTN-mobile-videophone-protocol according to ITU-T H.223;

demultiplexing the multiplexed information data blocks into demultiplexed information data blocks; and assigning the demultiplexed information data blocks to adaptation layers allocated by information data type, the first adaptation layer forwarding facsimile-encoded information data blocks for facsimile decompression.

2. A method according to claim 1, further comprising identifying audio, video, data and multimedia terminal control information data blocks, and wherein said assigning of the demultiplexed information data blocks to adaptation layers allocated by information data type assigns the demultiplexed information data blocks to at least one of an audio adaptation layer, a video adaptation layer, a data adaptation layer, as well as facsimile adaptation layers for facsimile data and control.

3. A method according to claim 1, wherein said transmitting employs a facsimile transmission protocol according to ITU-T T.4 and ITU-T T.30.

4. A method for transmitting facsimile-encoded information from sending communication terminal equipment via a communication network to receiving communication terminal equipment, the sending and receiving terminal equipment being multimedia capable, said method comprising:

compressing input information in the sending communication terminal equipment into facsimile-encoded information;

transferring the facsimile-encoded information and facsimile control information to a common facsimile adaptation layer;

translating the facsimile-encoded information and the facsimile control information into facsimile-encoded information data blocks and facsimile control information data blocks;

transferring the data blocks to a multiplex layer and identifying the data blocks as one of a facsimile control information data block and a facsimile-encoded information data block;

multiplexing the facsimile-encoded information data blocks in the sending communication terminal equipment with other information data blocks within the multiplex layer into multiplexed information data blocks;

transmitting the multiplexed information data blocks to the receiving communication terminal equipment utilizing a PSTN-mobile-videophone-protocol according to ITU-T H.223;

demultiplexing the multiplexed information data blocks into demultiplexed information data blocks;

assigning the demultiplexed information data blocks to adaptation layers allocated by information data type; and decompressing the facsimile-encoded information data blocks.

5. A facsimile device for transmitting facsimile-encoded information between multimedia-capable communication terminal equipment, comprising:

a modem connected to a communication controller associated with a multimedia multiplexer;

a facsimile encoder/decoder associated with an audio input/output unit having an audio signal encoder/decoder for compression and decompression of audio input/output signals; and a processor that assigns demultiplexed information data blocks to adaptation layers allocated by information data type; wherein said facsimile device utilizes the PSTNmobile-videophone-protocol ITU-T H.223.

* * * * *